April 20, 1926.

T. C. LEAKE

TRACTOR

Filed Oct. 10, 1921

1,581,648

2 Sheets-Sheet 1

INVENTOR
Thomas C. Leake
BY
Duell, Warfield & Duell.
ATTORNEY

April 20, 1926.
T. C. LEAKE
TRACTOR
Filed Oct. 10, 1921
1,581,648
2 Sheets-Sheet 2
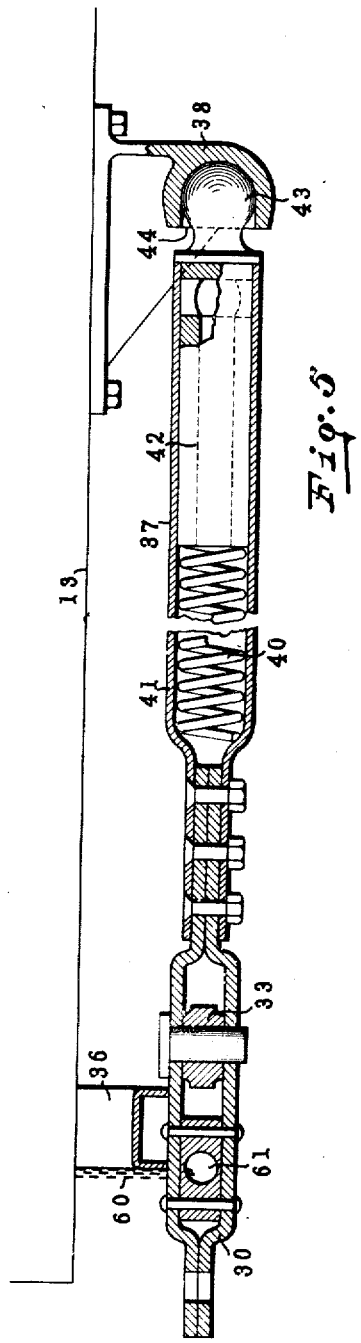
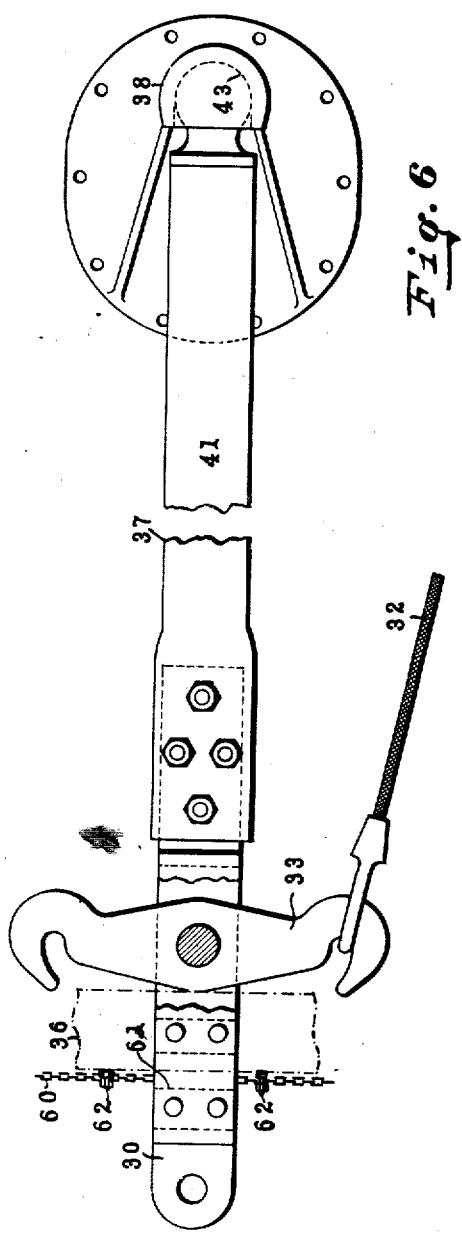
INVENTOR
Thomas C. Leake
BY
Duell, Warfield ...
ATTORNEY Patented Apr. 20, 1926.

1,581,648

UNITED STATES PATENT OFFICE.

THOMAS C. LEAKE, OF NEW YORK, N. Y., ASSIGNOR TO BEAR TRACTOR CORPORATION OF AMERICA, OF NEW YORK, N. Y., A CORPORATION OF DELAWARE.

TRACTOR.

Application filed October 10, 1921. Serial No. 506,638.

*To all whom it may concern:*

Be it known that I, THOMAS C. LEAKE, a citizen of the United States, residing at New York, in the county of New York and State of New York, have invented certain new and useful Improvements in Tractors, of which the following is a full, clear, and exact description, such as will enable others skilled in the art to which it appertains to make and use the same.

This invention relates to tractors, and more particularly to the draft mechanism for tractors.

The invention has for its general object an improved construction and arrangement of parts for connecting tractors to draw loads and for accomplishing the equable distribution of stresses throughout the tractor proper.

A specific object of this invention is to provide a draft mechanism embodying an improved arrangement which is resistent to sudden shocks.

Another object is to provide an improved draft mechanism which is constructed to take advantage of the inherent resiliency of the cables or connecting members generally employed as a part thereof.

Still another object is to provide an improved disposition of the draft mechanism with respect to the center of gravity of the tractor so that moments tending to cause the tractor to swerve or rise from the ground under load are avoided.

Other objects and advantages will in part be specifically pointed out hereinafter and in part obvious from the arrangement and constructions here set forth.

The invention accordingly consists in the features of construction, combinations of elements and arrangement of parts which will be exemplified in the construction hereinafter set forth, and the scope of the application will appear in the appended claims.

Figure 1:
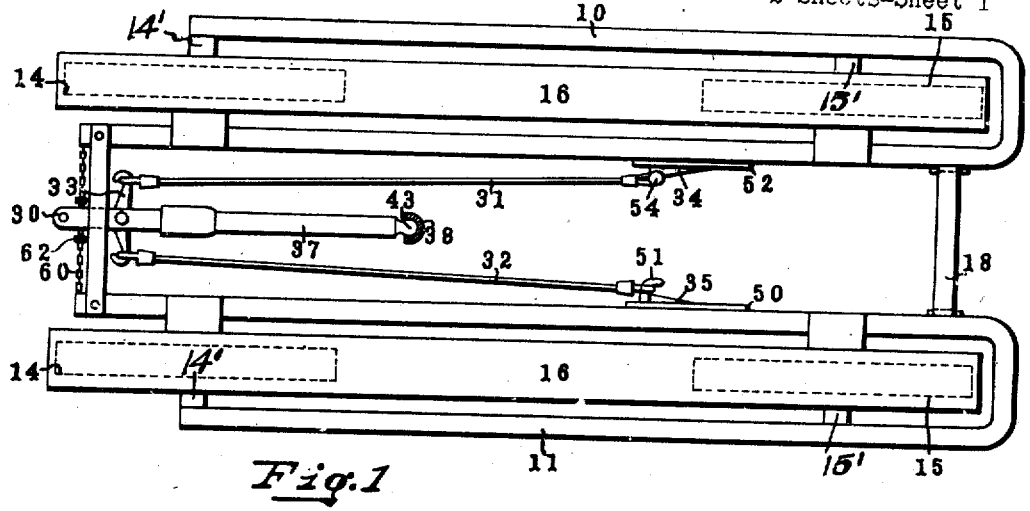

For a more complete understanding of the nature and advantages of this invention reference should be had to the following detailed description, which describes the best illustrative embodiment of this invention at present known to me, taken in connection with the accompanying drawing in which, Figure 1 is a plan view showing diagrammatically a tractor provided with draft mechanism constructed in accordance with this invention, the motor unit, together with its supporting frame, being removed in the interest of clearness of disclosure.

Figure 2:
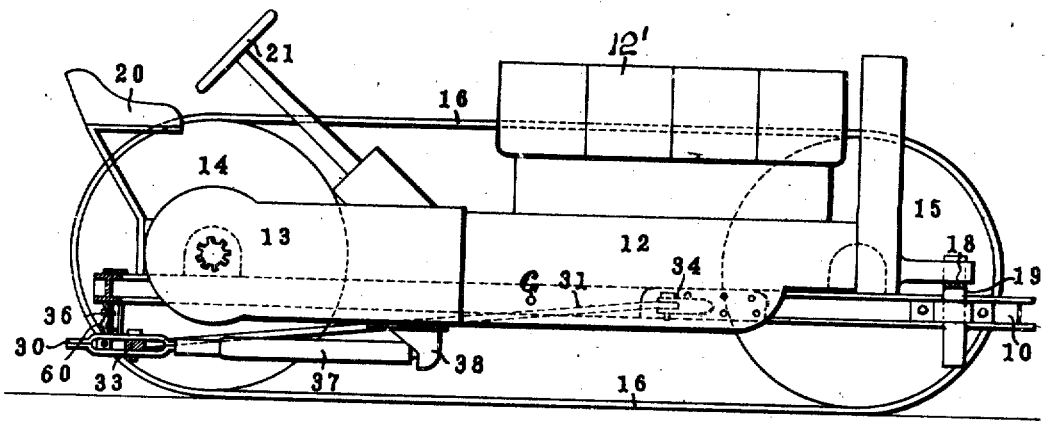

Fig. 2 is a longitudinal vertical section through Fig. 1, taken just inside the near side-frame element and showing in elevation the improved draft gear applied to the tractor, the motor unit, together with its supporting frame, being shown in position, the showing being diagrammatic for purpose of clearness of disclosure.

Referring now to the drawings in which similar parts are designated by like reference characters, side tractor frames 10 and 11 are secured respectively in pivoted relation at each side of the power unit frame 12 upon which the motor element 12' is carried. At the rear end of the power unit frame there is a gear housing 13 for containing the transmission gear for transmitting power from the motor to the driving elements of the tractor. The tractor frames 10 and 11 are pivoted at their rear ends, as at 14', at the axes of the driving sprockets 14, while at the front ends of these frames idler sprockets 15 are mounted as indicated at 15'. The idler and sprocket on each side frame carry a flexible chain-like track element 16 extending therearound, which is adapted to grip the ground and is laid as the tractor travels along in a manner known in the art. The power unit frame 12, carrying the motor 12', is disposed intermediate the two track frames, 10 and 11. At its forward end, the power unit frame is supported by a cross-bar 18 which spans the space at the front end of the tractor between the frames 10 and 11 and is suitably articulated thereto, as indicated at 19. A seat 20 is provided near the rear end of the power unit frame for the accommodation of the operator, suitable controlling means being provided adjacent the seat, as the steering wheel and column 21 shown in Fig. 2.

The diagrammatic disclosure of the drawing, together with the above description thereof, is intended only for the purpose of showing the relation of the improved draft gear construction thereto. Since the frame structure is not claimed herein per se, it is not considered that a structural showing of the frame is necessary for a full understanding to those skilled in the art of the operation and relation of the improved draft gear mechanism.

The draft mechanism with which the tractor is provided in accordance with this invention in order that it may be coupled to draw loads, comprises a draft element or coupler bar 30 which is disposed at the rear end of the tractor, beneath the motor element, and is connected to each of the tractor frames 10 and 11 by means of the flexible cables or connecting members 31 and 32, which extend from the extremities of an equalizing bar 33 pivoted to the coupler bar 30 back to two hook or securing members 34 and 35 which are secured respectively to the inside portions of the tractor frames 10 and 11.

The coupler 30 is retained normally up against the under side of guard rail 36 which extends from one tractor frame to the other at the rear of the tractor. This guard rail is not necessarily secured to the tractor frames 10 and 11, but may be supported at the rear of the tractor in any suitable way, for instance, by securing the same to the housing 13. The retention of the coupler bar 30 in this position is accomplished by maintaining the connecting members 31 and 32 constantly under tension by means of the resilient strut or compression member 37 which is interposed between the coupler 30 and a rigid part or abutment 38 on the housing 13 of the motor element.

The strut 37, as clearly shown in Fig. 5, contains a spring 40 which is under compression and reacts at one end against an interior abutment of the tubular housing 41 which is secured on coupler bar 30 and has slidably mounted therein the plunger 42, whose inner end is engaged by the other end of spring 40. The front or outer end of the plunger 42 is fashioned in the shape of a ball, as shown at 43, to fit into the socket-like cavity 44 in the fixed abutment 38. The ball and socket connection thus provided insures the free, angular, lateral or vertical movement of the strut to accommodate itself to any changing position in the line of action between the strut and the connecting cables 31 and 32. The tension under which the cables are maintained by this construction is a yielding one, though it keeps the cables fully stretched so that there is no slack in them at any time, the tension being normally equal in each where the lever arms of bar 33 are equal and the tractor is traveling straight ahead.

Figure 4:
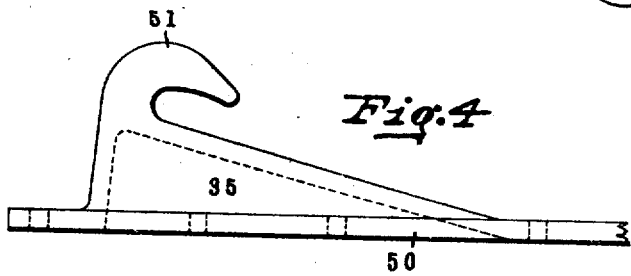

In order that the draft mechanism may be readily attached to and detached from the tractor frames, the securing members at 34 and 35 are specially contrived. The member at 35, here shown more fully in Fig. 4, is illustrated as having a rugged-cast metal base portion 50 which is adapted to be riveted to the tractor frame. This base portion has a hook proper at 51 which is adapted to engage with a suitable eye formed at the end of the cable or connecting member 32.

Figure 3:
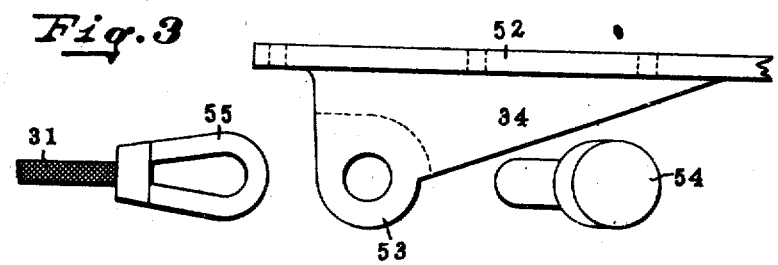

The securing member 34, shown more clearly in Fig. 3, on the other hand comprises a rugged cast metal base portion 52 which is adapted to be riveted or otherwise secured to the tractor frame; this securing member is provided with perforated spaced lugs 53 for receiving a pin 54 adapted to engage with the eye member 55 at the forward end of the connecting member 31, when said eye member is in position between said spaced lugs.

By this arrangement the draft mechanism may be put in place by first hooking the connecting members 31 and 32 in place at their rear ends to the equalizing bar 33, and subsequently fastening their forward ends to the securing members 34 and 35. In the case of cable 32, this is accomplished by merely hooking its forward eye over the hook at 41, while the strut 37 is seated in the socket of part 38. The connecting member 31 is now drawn up until its forward eye is in register with the openings in the lugs 43 of the securing member 34, and the pin 44 is dropped in place. The drawing up of the connecting member 31 to its proper place for attachment to the securing member 34 compresses the spring 40 in the strut member 37, acting through the equalizing bar 33 whereby the terminal loop 55 is brought into proper alignment for the insertion of the pin 54. It is also seen that this construction permits the draft mechanism to be readily removed out in the fields by a single operator, since all that is required is to draw up on the connecting member 31 sufficiently to relieve it of the tension under which it is normally maintained, when the pin 54 may be removed. It is then a matter merely of dropping the strut 37 out of the socket at 38 and unhooking the connecting member 32 to remove entirely the draft mechanism from the tractor.

By this construction it is also seen that the draft mechanism is always retained in proper place up next to the guard rail 36, ready to be coupled to any of the usual agricultural implements. The retention of connecting members 31 and 32 in place without slack, also enables the tractor to be started up to draw the coupled agricultural implement without fear of jerking or snapping these members, since there is no slack to be taken up. Furthermore, by reason of the fact that these members are normally taut, the pull of the load is more gradually applied, thereby permitting the members 31 and 32 to give elastically, utilizing to the full the elastic properties of the members 31 and 32.

The disposition of the securing members 34 and 35 on the track frames 10 and 11, is, moreover, a matter requiring some attention. This disposition is preferably such that the reaction of the tractive effort on the connecting members 31 and 32 is directly through or slightly below the center of gravity of the tractor. This disposition is illustrated especially in Fig. 2 of the drawing where the center of gravity of the tractor is indicated at G. The securing members 34 and 35 are accordingly attached to the frames 10 and 11 far enough forward for the line of draft to pass immediately below the point G on the tractor. This disposition of the cables avoids any moment on the tractor tending to turn it about its center of gravity which would lift its front end off the ground. On the other hand, any turning moment there may be, due to the draft stresses acting through the members 31 and 32, results in a moment tending to rotate the track frames 10 and 11 downwardly around their pivotal points 14' and thus holding the flexible traction elements or treads 16 firmly in contact with the ground and minimizing the tendency of the tractor to rear upwardly at its forward end.

For limiting lateral swinging movement in either direction of the coupler bar 30, so as to avoid injurious contact thereof with the frame structure when the tractor is turned sharply, a flexible member such as a chain 60 is secured at opposite ends to stationary parts of the tractor frame. This chain extends downwardly intermediate its ends through a suitable opening 61 in the coupler bar, and secured thereto at either side of the bar is a stop 62. These stops engage with opposite sides of the bar to prevent excessive swinging thereof in either direction.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention what I claim as new and desire to secure by Letters Patent is:—

1. The combination with a tractor having rearwardly pivoted side frames at opposite sides thereof, of a draft element anchored to the tractor, tension draft members connected to said draft element and said side frames, said draft element having a yielding member connected thereto for maintaining said tension members constantly under tension.

2. The combination with a tractor having rearwardly pivoted side frames at opposite sides thereof, of a draft element anchored to the tractor, flexible tension draft members connected to said side frames, and an equalizing connection between said tension draft members and said draft element, said draft element having a yielding member connected thereto for maintaining said tension draft members constantly under tension.

3. In a draft mechanism for tractors, in combination, a resilient draft strut anchored to the tractor, tension draft members connected to said draft strut and to the tractor frame and kept constantly under tension through the resiliency of said draft strut.

4. A draft mechanism for tractors and the like having pivoted side frames, comprising a draft coupling having an equalizing bar, connecting members connecting said bar to said side frames, and means for maintaining said members constantly under tension.

5. A draft mechanism for tractors and the like having pivoted side frames, comprising a draft coupling having an equalizing bar, connecting members connecting said bar to said side frames, and a resilient compression strut interposed between a fixed part of the tractor and said coupling whereby said members are maintained constantly under yielding tension.

6. A draft mechanism for tractors and the like having pivoted side frames, comprising a draft coupling having an equalizing bar, connecting members connecting said bar to said side frames, and a strut interposed between a fixed part of the tractor and said coupling, said strut having a tubular housing, a plunger therein, and elastic means tending to force the plunger out.

7. A draft mechanism for tractors and the like having a pair of side frames, comprising a draft element, cables for connecting said element with said frames, and securing members on said frames to which said cables are attached; one member having a pin and eye formation adapted for cable attachment.

8. A draft mechanism for tractors and the like having a pair of side frames, comprising a draft element, cables for connecting said element with said frames, means for maintaining said cables constantly under tension, and securing members on said frames to which said cables are attached; one member having a pin and eye formation adapted for cable attachment.

9. A draft mechanism for tractors and the like having a pair of side frames, comprising a draft element, cables for connecting said element with said frames, a resilient compression strut interposed between a fixed part of the tractor and said element, and securing members on said frames to which said cables are attached; one member having a pin and eye formation adapted for cable attachment.

10. The combination with a tractor having independently pivoted side frames at opposite sides thereof, of a draft element anchored to said tractor, cables for connecting said draft element with said side frames, and securing members on said side frames to which said cables are attached, said securing members being disposed toward the forward ends of said side frames at points so the resultant line of tractive effort passes substantially through or just below the center of gravity of the tractor.

11. In a combination with a tractor having independently pivoted side frames at opposite sides thereof, of a draft element anchored to said tractor, cables for connecting said draft element with said side frames, a resilient strut for maintaining said cables constantly under tension, and securing members on said side frames to which said cables are attached, said securing members being disposed toward the forward ends of said side frames at points so the resultant line of tractive effort passes substantially through or just below the center of gravity of the said tractor.

12. In a draft mechanism for tractors, in combination, rearwardly pivoted tractor side frames, a coupler bar, draft members connected to said side frames, and equalizing connections between said coupler bar and said draft members.

13. In a draft mechanism for tractors, in combination, rearwardly pivoted tractor side frames, a coupler bar pivotally mounted on said tractor, flexible draft members connected to said side frames, and equalizing connections between said coupler bar and said draft members.

14. In a draft mechanism for tractors, in combination, pivoted side frames, a coupler bar, draft members connected to said side frames, equalizing connections between said coupler bar and said draft members, pivoted side frames, a coupler bar pivotally mounted on said tractor, flexible draft members connected to said side frames, equalizing connections between said coupler bar and said draft members, and means for limiting lateral pivotal movement of said coupler bar.

15. In a draft mechanism for tractors, in combination, side frame members, a laterally swinging coupler bar, means for connecting said coupler bar to said frame members, and a flexible member for supporting the swinging end of said coupler bar and for limiting the swinging movement thereof.

16. In a draft mechanism for tractors, in combination, side frame members, a laterally swinging coupler bar, means for connecting said coupler bar to said frame members, and a transversely disposed flexible member having stops secured thereon for limiting lateral swinging movement of said coupler bar.

17. In a draft mechanism for tractors, in combination, a laterally swinging coupler bar connected with a tractor, and a transversely disposed flexible supporting member extending into a supporting seat in the swinging end of said coupler bar for supporting the latter for lateral swinging movement, and stops secured on said flexible member for limiting the lateral swinging movement of said coupler bar.

In testimony whereof I affix my signature.

THOMAS C. LEAKE.

pression strut interposed between a fixed part of the tractor and said element, and securing members on said frames to which said cables are attached; one member having a pin and eye formation adapted for cable attachment.

10. The combination with a tractor having independently pivoted side frames at opposite sides thereof, of a draft element anchored to said tractor, cables for connecting said draft element with said side frames, and securing members on said side frames to which said cables are attached, said securing members being disposed toward the forward ends of said side frames at points so the resultant line of tractive effort passes substantially through or just below the center of gravity of the tractor.

11. In a combination with a tractor having independently pivoted side frames at opposite sides thereof, of a draft element anchored to said tractor, cables for connecting said draft element with said side frames, a resilient strut for maintaining said cables constantly under tension, and securing members on said side frames to which said cables are attached, said securing members being disposed toward the forward ends of said side frames at points so the resultant line of tractive effort passes substantially through or just below the center of gravity of the said tractor.

12. In a draft mechanism for tractors, in combination, rearwardly pivoted tractor side frames, a coupler bar, draft members connected to said side frames, and equalizing connections between said coupler bar and said draft members.

13. In a draft mechanism for tractors, in combination, rearwardly pivoted tractor side frames, a coupler bar pivotally mounted on said tractor, flexible draft members connected to said side frames, and equalizing connections between said coupler bar and said draft members.

14. In a draft mechanism for tractors, in combination, pivoted side frames, a coupler bar, draft members connected to said side frames, equalizing connections between said coupler bar and said draft members, pivoted side frames, a coupler bar pivotally mounted on said tractor, flexible draft members connected to said side frames, equalizing connections between said coupler bar and said draft members, and means for limiting lateral pivotal movement of said coupler bar.

15. In a draft mechanism for tractors, in combination, side frame members, a laterally swinging coupler bar, means for connecting said coupler bar to said frame members, and a flexible member for supporting the swinging end of said coupler bar and for limiting the swinging movement thereof.

16. In a draft mechanism for tractors, in combination, side frame members, a laterally swinging coupler bar, means for connecting said coupler bar to said frame members, and a transversely disposed flexible member having stops secured thereon for limiting lateral swinging movement of said coupler bar.

17. In a draft mechanism for tractors, in combination, a laterally swinging coupler bar connected with a tractor, and a transversely disposed flexible supporting member extending into a supporting seat in the swinging end of said coupler bar for supporting the latter for lateral swinging movement, and stops secured on said flexible member for limiting the lateral swinging movement of said coupler bar.

In testimony whereof I affix my signature.

THOMAS C. LEAKE.

Certificate of Correction.

It is hereby certified that in Letters Patent No. 1,581,648, granted April 20, 1926, upon the application of Thomas C. Leake, of New York, N. Y., for an improvement in " Tractors," errors appear in the printed specification requiring correction as follows: Page 2, line 62, after the word " The " insert the word *securing;* page 3, line 13, strike out the article " the "; page 4, line 47, claim 14, beginning with the word " pivoted " strike out all to and including the word " pivoted " in line 50 and insert instead *rearwardly pivoted tractor;* and that the said Letters Patent should be read with these corrections therein that the same may conform to the record of the case in the Patent Office.

Signed and sealed this 25th day of May, A. D. 1926.

[SEAL.]

WM. A. KINNAN,
*Acting Commissioner of Patents.*

Certificate of Correction.

It is hereby certified that in Letters Patent No. 1,581,648, granted April 20, 1926, upon the application of Thomas C. Leake, of New York, N. Y., for an improvement in " Tractors," errors appear in the printed specification requiring correction as follows: Page 2, line 62, after the word " The " insert the word *securing;* page 3, line 13, strike out the article " the "; page 4, line 47, claim 14, beginning with the word " pivoted " strike out all to and including the word " pivoted " in line 50 and insert instead *rearwardly pivoted tractor;* and that the said Letters Patent should be read with these corrections therein that the same may conform to the record of the case in the Patent Office.

Signed and sealed this 25th day of May, A. D. 1926.

[SEAL.]

WM. A. KINNAN,
*Acting Commissioner of Patents.*